United States Patent [19]
Miyabayashi et al.

[11] Patent Number: 5,401,598
[45] Date of Patent: Mar. 28, 1995

[54] ELECTRODE FOR SECONDARY BATTERY

[75] Inventors: Mitsutaka Miyabayashi; Manabu Hayashi, both of Amimachi, Japan

[73] Assignee: Mitsubishi Petrochemical Co., Ltd., Tokyo, Japan

[21] Appl. No.: 971,831

[22] PCT Filed: Jun. 19, 1992

[86] PCT No.: PCT/JP92/00789
§ 371 Date: Feb. 19, 1993
§ 102(e) Date: Feb. 19, 1993

[87] PCT Pub. No.: WO93/00717
PCT Pub. Date: Jan. 7, 1993

[30] Foreign Application Priority Data
Jun. 20, 1991 [JP] Japan .................. 3-174787

[51] Int. Cl.$^6$ .............................. H01H 4/02
[52] U.S. Cl. ...................... 429/218; 429/194
[58] Field of Search ................ 429/218, 194

[56] References Cited
U.S. PATENT DOCUMENTS
5,028,500  7/1991  Fong et al. ............. 429/194
5,153,082 10/1992  Ogino et al. ............ 429/194

Primary Examiner—Prince Willis, Jr.
Assistant Examiner—M. Nuzzolillo
Attorney, Agent, or Firm—Oblon, Spivak, McClelland, Maier & Neustadt

[57] ABSTRACT

An electrode for a secondary battery is described comprising an alkali metal carried on a carrier composed mainly of a carbonaceous material satisfying the following characteristics (1) and (2), and having a multiphasic structure comprising a nucleus and a surface layer around the nucleus, (1) a true density $\rho$ of 1.80 g/cm$^3$ or more, and
(2) in the Raman spectrum analysis using an argon ion laser beam with a wavelength of 5145 Å, it has a peak $P_A$ in the range of 1580 to 1620 cm$^{-1}$ and a peak $P_B$ in the range of 1350 to 1370 cm$^{-1}$, and the ratio of intensity $I_B$ of the $P_B$ to intensity $I_A$ of the $P_A$, $R = I_B/I_A$ is 0.4 or more.

19 Claims, 1 Drawing Sheet

ELECTRODE FOR SECONDARY BATTERY

BACKGROUND OF THE INVENTION

1. Field of the Invention

The invention relates to an electrode for a secondary battery having high capacity and excellent charging and discharging characteristics. Further, it relates to a negative electrode for a secondary battery, having, as an active substance, an alkali metal, preferably lithium metal.

2. Discussion of the Background

As an electrode for a lithium secondary battery, a conductive polymer such as polyacetylene, etc. has been proposed. However, a conductive polymer is insufficient in its doping amount of Li ions, i.e. its electrode capacity and stable charging and discharging characteristics. Also, an attempt has been made to use metallic lithium as a negative electrode of a lithium secondary battery, but in this case, the charging and discharging cycle characteristics are extremely bad.

That is, during the discharging of the battery, lithium moves as lithium ions from a negative electrode into an electrolyte. During charging, these lithium ions are again electrodeposited as metallic lithium onto the negative electrode body. When this charging and discharging cycle is repeated, the metallic lithium electrodeposited becomes dendrite-shaped. Since this dendrite-shaped metallic lithium is a very active substance, it decomposes the electrolyte, thereby causing the deterioration of the charging and discharging cycle characteristics of the battery. Further, with continued growth this dendrite-shaped metallic lithium product finally reaches a positive electrode body by penetrating through a separator, causing a short-circuit. In other words, with such a system the charging and discharging life cycle is short.

In order to avoid such problems, a negative electrode in which lithium or an alkali metal composed mainly of lithium as an active substance has been attempted which is carried on a carbonaceous material prepared by sintering an organic compound. However, by using such a negative the electrode body, the charging and discharging cycle characteristics of the negative electrode could be dramatically improved, but, on the other hand, the electrode capacity of this negative electrode was not satisfactory.

OBJECTS OF THE INVENTION

An object of the present invention is, under the state of the art as described above, to provide a negative electrode for a secondary battery having large electrode capacity and excellent charging and discharging cycle characteristics.

SUMMARY OF THE INVENTION

The present inventors have found that an electrode having an alkali metal which is an active substance carried on a carrier comprising a carbonaceous material described below is extremely effective for accomplishing the above object.

That is, the electrode for secondary battery of the present invention comprises an alkali metal which is an active substance carried on a carrier composed mainly of a carbonaceous material satisfying the following requirements (1) and (2), and having a multi-phasic structure comprising a nucleus and a surface layer involving the nucleus, (1) a true density of 1.80 g/cm$^3$ or more, and (2) in the Raman spectrum analysis using an argon ion laser beam with a wavelength of 5145 Å, it has a peak $P_A$ in the region of 1580 to 1620 cm$^{-1}$ and a peak $P_B$ in the region of 1350 to 1370 cm$^{-1}$, and the ratio of intensity $I_B$ of $P_B$ to intensity $I_A$ of $P_A$ as mentioned above, $R=I_B/I_A$, is 0.4 or more.

The carbonaceous material to be used in the present invention has these characteristics of true density and Raman spectrum irrespective of its shape, such as granular, fibrous, etc.

This carbonaceous material has a multi-phasic structure comprises at least two phases: a carbonaceous material forming a surface layer and a carbonaceous material forming a nucleus involved thereby. The fine structure of this carbonaceous material forming a surface layer contributes to the Raman spectrum described above. On the other hand, the true density is an average value of the densities of the carbonaceous materials in the multi-phasic structure including a surface layer and a nucleus. In general, as the density of the carbonaceous material is higher, the peak intensity ratio R of the Raman spectrum is smaller. The characteristics of the carbonaceous material of the present invention are high true density and large R which are enabled for the first time by the multi-phasic structure described above.

First, the carbonaceous material to be used in the present invention has a true density of 1.80 g/cm$^3$ or more, preferably 2.00 g/cm$^3$ or more, more preferably 2.05 g/cm$^3$ or more, further preferably 2.10 g/cm$^3$ or more to 2.26 g/cm$^3$ or less, particularly preferably 2.15 g/cm$^3$ or more to 2.25 g/cm$^3$ or less, most preferably 2.18 g/cm$^3$ or more to 2.23 g/cm$^3$ or less, particularly most preferably 2.20 g/cm$^3$ or more to 2.23 g/cm$^3$ or less.

Further, the carbonaceous material to be used in the present invention has the following spectral characteristics in the Raman spectrum analysis using an argon ion laser beam with a wavelength of 5145 Å. In the following, spectra and peaks are Raman spectra under the conditions described above unless otherwise indicated.

That is, it has a peak $P_A$ in the region of 1580 to 1620 cm$^{-1}$, and a peak $P_B$ in the region of 1350 to 1370 cm$^{-1}$. $P_A$ is a peak which is observed corresponding to a crystalline structure grown and formed by laminating a spread of a net surface of aromatic rings, and $P_B$ is a peak corresponding to an irregular non-crystalline structure. The ratio of peak intensities $I_B$ and $I_A$ ($R=I_B/I_A$) becomes larger as the ratio of the non-crystalline structure portion at a surface layer of the carbonaceous material, i.e., a carbonaceous particle, a carbonaceous fiber, etc., is larger.

In the present invention, R is 0.4 or more, preferably 0.6 or more, more preferably 0.9 or more, particularly preferably 0.90 to 1.5, most preferably 0.90 to 1.3.

By using the carbonaceous material satisfying the conditions of true density and R as described above as a carrier of a negative electrode, an electrode having an excellent balance of electrode capacity size and charging and discharging cycle characteristics can be obtained.

Further, the carbonaceous material to be used in the present invention has Raman spectrum as described below. That is, the position of $P_A$ changes depending on the degree of completeness of the crystalline portion. The position of $P_A$ of the carbonaceous material to be used in the present invention is 1580 to 1620 cm$^{-1}$ as described above, but it is preferably in the range of 1585 to 1620 cm$^{-1}$, more preferably 1590 to 1620 cm$^{-1}$, further preferably 1595 to 1615 cm$^{-1}$, particularly preferably 1600 to 1610 cm$^{-1}$.

The half-value width of the peak is narrower as the higher structure of the carbonaceous material is more uniform. The half-value width of $P_A$ of the carbonaceous material to be used in the present invention is preferably 25 cm$^{-1}$ or more, more preferably 27 cm$^{-1}$ or more, further preferably 30 to 60 cm$^{-1}$, particularly preferably 35 to 55 cm$^{-1}$, most preferably 40 to 50 cm$^{-1}$.

In general, $P_B$ has a peak in 1360 cm$^{-1}$. The half-value width of $P_B$ is preferably 20 cm$^{-1}$ or more, more preferably 20 to 150 cm$^{-1}$, further preferably 25 to 125 cm$^{-1}$, particularly preferably 30 to 115 cm$^{-1}$, most preferably 40 to 110 cm$^{-1}$.

In the Raman spectrum analysis, the G value defined by the following formula (1):

$$G = \frac{I(\text{integrated intensity of spectrum in the range of 1340 to 1380 cm}^{-1})}{I(\text{integrated intensity of spectrum in the range of 1580 to 1620 cm}^{-1})} \quad (1)$$

of the invention carbonaceous material is 0.2 or more, preferably 0.3 or more, more preferably 0.4 to 1.8, further preferably 0.5 to 1.5, particularly preferably 0.6 to 1.3, most preferably 0.7 to 1.1.

Further, the carbonaceous material constituting the electrode material of the present invention preferably has the above true density $\rho$ (g/cm$^3$) and the G value defined by the above formula (1) satisfying the following formulae (2) to (4).

$$2.05 \leq \rho \leq 2.26 \quad (2)$$
$$G \geq 0.30 \quad (3)$$
$$G \geq -3.33\rho + 7.50 \quad (4)$$

It is more preferred to satisfy the following formulae (2)′, (3)′ and (4)′.

$$2.08 \leq \rho \leq 2.24 \quad (2)'$$
$$G \geq 0.40 \quad (3)'$$
$$G \geq -3.33\rho + 7.60 \quad (4)'$$

It is further preferred to satisfy the following formulae (2)″, (3)″ and (4)″.

$$2.10 \leq \rho \leq 2.22 \quad (2)''$$
$$G \geq 0.50 \quad (3)''$$
$$G \geq -3.33\rho + 7.65 \quad (4)''$$

It is particularly preferred to satisfy the following formulae (2)‴, (3)‴ and (4)‴.

$$2.12 \leq \rho \leq 2.21 \quad (2)'''$$
$$G \geq 0.60 \quad (3)'''$$
$$G \geq -3.33\rho + 7.70 \quad (4)'''$$

It is most preferred to satisfy the following formulae (2)″″, (3)″″ and (4)″″.

$$2.13 \leq \rho \leq 2.20 \quad (2)''''$$
$$G \geq 0.70 \quad (3)''''$$
$$G \geq -3.33\rho + 7.71 \quad (4)''''$$

It is particularly most preferred to satisfy the following formulae (2)″″′, (3)″″′ and (4)″″′.

$$2.15 \leq \rho \leq 2.19 \quad (2)'''''$$
$$G \geq 0.80 \quad (3)'''''$$
$$G \geq -3.33\rho + 7.72 \quad (4)'''''$$

Further, the carbonaceous material to be used in the present invention preferably has at least two peaks of diffraction lines corresponding to the multi-phasic structure described above in the X-ray wide angle diffraction pattern. That is, as the peak of the diffraction line corresponding to the crystalline structure at the surface layer portion described above, the spacing $d_{002}$ of a (002) plane is preferably 3.45 Å or more, more preferably 3.47 Å or more, further preferably 3.49 to 3.75 Å, particularly preferably 3.50 to 3.70 Å, most preferably 3.56 to 3.60 Å. Further, the crystallite size in the c-axis direction (Lc) is preferably less than 150 Å, more preferably 100 Å or less, further preferably 7 to 70 Å, particularly preferably 10 to 40 Å, most preferably 12 to 30 Å.

On the other hand, as the peak of diffraction line corresponding to the structure of the nuclear portion involved by a surface layer of the carbonaceous material, $d_{002}$ is preferably less than 3.45 Å, more preferably 3.36 to 3.42 Å, further preferably 3.37 to 3.41 Å, particularly preferably 3.37 to 3.40 Å. Also, Lc is preferably 150 Å or more, more preferably 180 Å or more, further preferably 190 to 500 Å, particularly preferably 200 to 300 Å.

The peaks in the X-ray wide angle diffraction pattern are separated by obtaining an approximate value of a profile of each peak by the asymmetric Pearson VII function and applying the Gauss-Jordan method as a method of least squares.

The peak intensity ratio $I_{(3.45 \text{ or more})}/I_{(3.35 \text{ to } 3.45)}$ of the two peaks thus separated is preferably 0.001 or more, more preferably 0.002 to 0.50, further preferably 0.003 to 0.30, particularly preferably 0.005 to 0.15, most preferably 0.007 to 0.10, particularly most preferably 0.010 to 0.030.

Here, $I_{(3.45 \text{ or more})}$ is a peak intensity of the peak of which $d_{002}$ is 3.45 Å or more, and $I_{(3.35 \text{ to } 3.45)}$ is a peak intensity of the peak of which $d_{002}$ is 3.35 Å or more and less than 3.45 Å.

Further, the ratio of diffraction intensity $I(2\theta=25°)$ when $2\theta$ (diffraction angle)=25.0° to $I_{(3.35 \text{ to } 3.45)}$, $I(2\theta=25°)/I_{(3.35 \text{ to } 3.45)}$ is preferably 0.01 or more, more preferably 0.002 to 0.50, further preferably 0.003 to 0.3, particularly preferably 0.005 to 0.15, most preferably 0.007 to 0.10, particularly most preferably 0.01 to 0.03.

Also, when the carbonaceous material which constitutes a nucleus further comprises two or more phases, it has two or more peaks in the region where $d_{002}$ is 3.35 Å or more and less than 3.45 Å in the X-ray wide angle diffraction.

Further, when the carbonaceous material which constitutes a surface layer further comprises two or more phases, it has two peaks in the region where $d_{002}$ is 3.45 Å or more in the X-ray wide angle diffraction.

In this case, $I_{(3.45 \text{ or more})}$ is a sum of peak intensities of the peaks of which $d_{002}$ is 3.45 Å or more and $I_{(3.35 \text{ to } 3.45)}$ is a sum of peak intensities of the peaks of which $d_{002}$ is 3.35 Å or more and less than 3.45 Å, and the intensity ratio of the both, $I_{(3.45 \text{ or more})}/I_{(3.35 \text{ to } 3.45)}$ is preferably in the range of the values described above.

Moreover, when $I_{(3.45\ or\ more,\ integrated\ intensity)}$ is a slim of integrated intensities of the peaks of which $d_{002}$ is 3.45 Å or more and $I_{(3.35\ to\ 3.45,\ integrated\ intensity)}$ is a sum of integrated intensities of the peaks of which $d_{002}$ is 3.35 or more and less than 3.45 Å, the ratio of the both, $I_{(3.45,\ integrated\ intensity)}/I_{(3.35\ to\ 3.45,\ integrated\ intensity)}$ is preferably 0.001 to 0.8, more preferably 0.002 to 0.60, further preferably 0.003 to 0.50, particularly preferably 0.004 to 0.40, most preferably 0.005 to 0.30.

In the carbonaceous material constituting the electrode material of the present invention, the H/C atomic ratio is preferably 0.08 or less, more preferably 0.07 or less, further preferably 0.06 or less, particularly preferably 0.05 or less, most preferably 0.04 or less, particularly most preferably 0.03 or less.

The carbonaceous material to be used in the present invention shows, during differential thermal analysis, exothermic behavior in the wide temperature range in which at least two exothermic peaks are overlapped depending on the multi-phasic structure described above. It shows exothermic behaviour preferably in the temperature range of 100° C. or higher, more preferably in the temperature range of 150° C. or higher, further preferably in the temperature range of 200° C. or higher, particularly preferably in the temperature range of 250° to 500° C., most preferably in the temperature range of 280° to 400° C.

The temperature at which the exothermic peak ends is preferably 800° C. or higher, more preferably 810° C. or higher, further preferably 820° to 980° C., particularly preferably 830° to 970° C., most preferably 840° to 950° C.

The temperature at which the exothermic peak begins is preferably 700° C. or lower, more preferably 680° C. or lower, further preferably 550° to 680° C., particularly preferably 570° to 670° C., most preferably 580° to 650° C. Further, the exothermic peak temperature is preferably 650° to 840° C., more preferably 660° to 835° C., further preferably 670° to 830° C., particularly preferably 680° C. to 820° C., most preferably 690° to 810° C.

The peak corresponding to the nucleus carbonaceous material is preferably 840° C. or higher, more preferably 860° C. or higher, further preferably 880° C. or higher, particularly preferably 900° C. or higher, most preferably 920° to 1,200° C.

The carbonaceous material to be used in the present invention preferably shows, also in its differential thermal analysis, for example, at least two exothermic peaks depending on the multi-phasic structure. That is, the peak corresponding to the carbonaceous material of a surface layer is preferably lower than 810° C., more preferably 600° to 800° C., further preferably 650° to 800° C., particularly preferably 700° to 800° C. The peak corresponding to the carbonaceous material of a nucleus is preferably 810° C. or higher, more preferably 820° C. or higher, further preferably 850° to 1,000° C.

In the primary differential absorption spectrum of electronic spin resonance, the carbonaceous material of the present invention preferably has two signal peaks corresponding to the multi-phasic structure described above. The carbonaceous material to be used in the present invention has signals in which the line width ($\Delta Hpp$: Gauss) between peaks of the primary differential absorption spectrum of electronic spin resonance corresponding to the carbonaceous material of a nucleus is preferably less than 100 Gauss, more preferably less than 50 Gauss, further preferably less than 30 Gauss, particularly preferably less than 20 Gauss, most preferably less than 10 Gauss.

Also, the line width ($\Delta Hpp$: Gauss) between peaks of the primary differential absorption spectrum of electronic spin resonance corresponding to the carbonaceous material of a surface layer, of the carbonaceous material to be used in the present invention, is preferably 10 Gauss or more, more preferably 20 Gauss or more, further preferably 30 Gauss or more, particularly preferably 50 Gauss or more, further most preferably 100 Gauss or more.

Further, in the electrode material of the present invention, the specific surface area S ($m^2/g$) and the true density $\rho$ ($g/m^3$) preferably satisfies $S \leq 41-15\rho$, more preferably $S \leq 40-15\rho$, further preferably $S \leq 39-15\rho$, particularly preferably $S \leq 36-15\rho$, most preferably $S \leq 38-15\rho$.

The carbonaceous material to be used in the present invention may have any desired shape such as granular, fibrous, etc., but the preferred shape is granular or fibrous and particularly preferred is the granular form. In the case of a granular form, the volume average particle size is preferably 200 μm or less, more preferably 100 μm or less, further preferably 0.5 to 80 μm, particularly preferably 1 to 30 μm, most preferably 2 to 20 μm. In the case of the fibrous form, the diameter is preferably 1 to 25 μm, more preferably 2 to 20 μm, and the length is preferably 10 mm or shorter, more preferably 5 mm or shorter.

Further, the carbonaceous material to be used in the present invention preferably has a specific surface area measured by the BET method of 1 to 100 $m^2/g$, more preferably 2 to 50 $m^2/g$, further preferably 2 to 30 $m^2/g$, particularly preferably 2 to 10 $m^2/g$, most preferably 2 to 8 $m^2/g$.

The carbonaceous material of the invention preferably has fine pores internally. The total fine pore volume and the average fine pore radius described below are determined by measuring the amount of the gas adsorbed onto the sample (or the amount of the gas released) under some equilibrium pressures by use of the quantitative volume method, and by measuring the amount of the gas adsorbed on the sample.

The total fine pore volume is determined from the total amount of the gas adsorbed at a relative pressure $P/Po = 0.995$, assuming that the fine pores are filled with liquid nitrogen.

P: vapor pressure of adsorbed gas (mmHg)
Po: saturated vapor pressure of adsorbed gas at cooling temperature (mmHg)

Further, from the nitrogen gas amount adsorbed ($V_{ads}$), the liquid nitrogen amount ($V_{liq}$) filled in the fine pores is calculated by using the following formula (5) to determine the total fine pore volume:

$$V_{liq} = (P_{atm} \cdot V_{ads} \cdot V_m)/RT \tag{5}$$

Here, $P_{atm}$ and T are atmospheric pressure ($kgf/cm^2$) and absolute temperature (K), respectively, and R is the gas constant. $V_m$ is a molecular volume of the gas adsorbed (34.7 $cm^3/mol$ for nitrogen).

The carbonaceous material to be used in the present invention preferably has a total fine pore volume determined as described above of $1.5 \times 10^{-3}$ ml/g or more. The total fine pore volume is more preferably $2.0 \times 10^{-3}$ ml/g or more, further preferably $3.0 \times 10^{-3}$ to $8 \times 10^{-2}$ ml/g, particularly preferably $4.0 \times 10^{-3}$ to $3 \times 10^{-2}$ ml/g.

The average fine pore radius ($\gamma_p$) is determined from the $V_{liq}$ determined by the formula (5) described above and the specific surface area S obtained by the BET method, by using the following formula (6). Here, the fine pore is assumed to be cylindrical.

$$\gamma_p = 2V_{liq}/S \qquad (6)$$

The average fine pore radius ($\gamma_p$) of the carbonaceous material thus determined from adsorption of nitrogen gas is preferably 8 to 100 Å. It is more preferably 10 to 80 further preferably 12 to 60 Å, particularly preferably 14 to 40 Å.

Further, in the carbonaceous material to be used in the present invention, the fine pore volume measured by a mercury porosimeter is preferably 0.05 ml/g or more, more preferably 0.10 ml/g or more, further preferably 0.15 to 2 ml/g, particularly preferably 0.20 to 1.5 ml/g.

The carbonaceous material to be used in the present invention can be synthesized by, for example, the following method. That is, in the first place, an organic compound is decomposed by heating at a temperature of 300° to 3,000° C. under an inert gas stream or under vacuum, and carbonized and graphitized to obtain a carbonaceous material having $d_{002}$ of less than 3.45 Å in the X-ray wide angle diffraction pattern, and having a true density exceeding 2.00 g/cm³, preferably 2.05 to 2.23 g/cm³, more preferably 2.10 to 2.23 g/cm³, particularly preferably 2.15 to 2.22 g/cm³. This carbonaceous material may have any desired shape such as granular fibrous etc.

As the above organic compound, there may be mentioned condensed polycyclic hydrocarbon compound comprising two or more monocyclic hydrocarbon compounds having three or more membered rings condensed to each other such as naphthalene, phenanthrene, anthracene, triphenylene, pyrene, chresene, naphthacene, picene, perylene, pentaphene and pentacene; or derivatives thereof such as carboxylic acids, carboxylic acid anhydrides and carboxylic acid imides of the above compounds; various pitches composed mainly of mixtures of the above respective compounds; condensed heterocyclic compounds comprising at least two or more heteromonocyclic compounds having three or more membered rings bonded to each other, or bonded to one or more monocyclic hydrocarbon compounds having three or more membered rings such as indole, isoindole, quinoline, isoquinoline, quinoxaline, phthalazine, carbazole, acridine, phenazine and phenanthridine; derivatives such as carboxylic acids, carboxylic acid anhydrides and carboxylic acids imides of the above respective compounds; further aromatic monocyclic hydrocarbons such as benzene, toluene and xylene, or derivatives such as carboxylic acids, carboxylic acid anhydrides and carboxylic acid imides thereof, for example, 1,2,4,5-tetracarboxylic acid, dianhydride thereof or derivatives such as diimide thereof, etc.

The above pitches are further described in detail. As an example thereof, there may be mentioned ethylene heavy end pitch formed when naphtha is decomposed, crude oil pitch, coal pitch, asphalt-decomposed pitch, pitch obtained by thermally decomposing polyvinyl chloride, etc. Further, there may be used mesophase pitches in which quinoline insolubles are preferably 80% or more, more preferably 90% or more, further preferably 95% or more, obtained by further heating these various kinds of pitches under inert gas stream.

Further, organic polymers may be used including aliphatic saturated or unsaturated hydrocarbons such as propane and propylene, halogenated vinyl resins such as polyvinyl chloride, polyvinylidene chloride, chlorinated polyvinyl chloride, etc., acrylic resins such as poly($\alpha$-halogenated acrylonitrile), etc. and conjugate type resins such as polyacetylene, polyphenylene vinylene, etc.

Or else, a carbonaceous material such as carbon black, coke, etc. as a starting material may be further heated to progress appropriately carbonization to obtain the carbonaceous material (N) which becomes a nucleus to be used in the present invention. As the carbonaceous material forming a nucleus, there may be used natural graphite, artificial graphite or graphite whisker grown in the gas phase.

Next, by using the carbonaceous material (N) obtained as described above as a nucleus, an organic compound is thermally decomposed under inert gas stream, and carbonized to form a surface layer of a new carbonaceous material (S) on the surface of the above nucleus.

As a method for forming the carbonaceous material (S) of a surface layer on the surface of the carbonaceous material (N) which becomes a nucleus, there may be selected optionally from, for example, (a) a method in which an organic compound is coated on the surface of the carbonaceous material (N) which becomes a nucleus, and then carbonized to form the carbonaceous material (S) as a surface layer, (b) a method in which a carbonaceous material (S) of a surface layer is deposited on the surface of the carbonaceous material (N) which becomes a nucleus by thermally decomposing a relatively monomeric organic compound, for example, paraffin, olefin, an aromatic compound, etc. having about 20 or less carbon atoms, and others.

As the above method (a), there may be mentioned a method in which an organic compound is dissolved in an organic solvent, this solution is mixed with the carbonaceous material (N), the mixture is heated to evaporate the organic solvent, whereby the organic compound is coated on the surface of the carbonaceous material (N), thereafter, the coated material is heated to be carbonized, and decomposed by heating to form the carbonaceous material (S) of a surface layer.

As the organic compound, there may be mentioned condensed polycyclic hydrocarbons such as naphthalene, phenanthrene, anthracene, triphenylene, pyrene, chresene, naphthacene, picene, perylene, pentaphene and pentacene, or derivatives thereof such as carboxylic acids, carboxylic acid anhydrides and carboxylic acid imides, heteropolycyclic compounds having three or more membered rings such as indole, isoindole and quinoline, derivatives thereof such as carboxylic acids, carboxylic acid anhydrides and carboxylic acids imides. Also, as the organic compound, the pitches described above may be used. In this case, decomposition and carbonization of the organic compound proceed on the surface of the carbonaceous material which becomes a nucleus. As in the case of using a pitch, carbonization proceeds through a liquid phase and further through a liquid crystal state so-called mesophase to form the carbonaceous material (S) of a surface layer, or carbonization may be carried out in gas phase as in the case of carboxylic acid anhydrides of condensed polycyclic hydrocarbons.

Also, as the above method (a), there may be mentioned a method in which the surface of the carbonaceous material (N) is coated with an organic polymeric compound, and the compound is then thermally decomposed in solid phase to form the carbonaceous material.

As the organic polymeric compound, there may be used cellulose; a phenol resin; an acrylic resin such as polyacrylonitrile, poly($\alpha$-halogenated acrylonitrile), etc.; a polyamideimide resin; a polyamide resin, etc.

After the carbonaceous material (S) of a surface layer is formed on the surface of the carbonaceous material (N) which becomes a nucleus, the resulting product can be made powder through pulverization process.

In either of the methods described above, the specific surface area U of the carbonaceous material having a multi-phasic structure is preferably made ½ or less, more preferably ⅓ or less of the specific surface area U (N) of the carbonaceous material (N) of a nucleus.

The thermal decomposition temperature for forming a surface layer is generally lower than the temperature for synthesizing the carbonaceous material which becomes a nucleus, preferably 300° to 2,000° C.

Also, when the organic compound is coated on the surface of the carbonaceous material (N) which becomes a nucleus, it is preferred that the organic compound is coated until the specific surface area becomes ½ or less of the specific surface area U of the carbonaceous material (N) and then carbonized, more preferably ⅓ or less, further preferably ¼ or less, particularly preferably 1/5 or less, most preferably 1/6 or less.

Further, in synthesis of the carbonaceous material (N) which becomes a nucleus, it is possible to synthesize an inner nucleus, and synthesize an outer nucleus thereon to synthesize a carbonaceous material which becomes a multi-phasic nucleus through multiple steps. Similarly, in synthesis of the carbonaceous material which becomes a surface layer, it is possible to synthesize an inner surface layer, and synthesize an outer surface layer thereon to synthesize a carbonaceous material which becomes a multi-phasic surface layer through multiple steps.

As described above, the carbonaceous material to be used in the present invention having a multi-phasic structure, an intensity ratio R of the peaks of Raman spectrum of 0.4 or more and a true density of 1.80 g/cm$^3$ or more can be obtained.

In the carbonaceous material having a multi-phasic structure thus obtained, as to the ratio of the nucleus portion and the surface layer portion, that of the nucleus is preferably 20 to 99% by weight, more preferably 30 to 95% by weight, further preferably 40 to 90% by weight, particularly preferably 50 to 85% by weight, most preferably 60 to 85% by weight; that of the surface layer is preferably 1 to 80% by weight, more preferably 5 to 70% by weight, further preferably 10 to 60% by weight, particularly preferably 15 to 50% by weight, most preferably 15 to 40% by weight.

Such a carbonaceous material has a structure in which a nucleus comprising one or plural particulate or fibrous carbonaceous materials is involved by a surface layer comprising a particulate or fibrous carbonaceous material having another crystalline structure. A schematic view illustrating the state is shown in FIG. 1.

The nucleus preferably has the volume average particle size of 30 μm or less, more preferably 20 μm or less, further preferably 1 to 15 μm. In a composite multi-phasic carbonaceous material including a surface layer formed by involving this nucleus, the ratio r of the particle size of the nucleus to its whole size is preferably 0.5 or more, more preferably 0.6 or more, further preferably 0.7 or more. Also, the thickness of the surface layer involving the nucleus is preferably 100 Å to 5 μm, more preferably 150 to 4 μm, further preferably 200 Å to 2 μm.

The carbonaceous material having a multi-phasic structure of the present invention may be used by mixing with a carbonaceous material (B) having a single-phase structure. The carbonaceous material (B) having a single-phase structure preferably has a plane spacing $d_{002}$ of a (002) plane according to X-ray diffraction of 3.36 Å or more and 3.65 Å or less, more preferably 3.37 Å or more and 3.60 Å or less, further preferably 3.37 Å or more and 3.50 Å or less. Also, the crystallite size in the C-axis direction Lc is preferably 15 Å or more, more preferably 20 to 800 Å, further preferably 25 to 750 Å, particularly preferably 150 to 600 Å, most preferably 160 to 300 Å.

The ratio of the carbonaceous material (B), in the mixture of the carbonaceous material (A) having a multi-phase structure of the present invention and the carbonaceous material (B) having a single-phase structure, is preferably less than 50% by weight, more preferably 10 to 40% by weight, further preferably 15 to 35% by weight.

The carbonaceous material to be used in the present invention is generally mixed with a polymeric binder to be made into an electrode material, and then molded into a shape of an electrode. As the polymeric binder, the following may be mentioned.

(1) Resinous polymers such as polyethylene, polypropylene, polyethylene terephthalate, aromatic polyamide, cellulose, etc.

(2) Rubber polymers such as styrene-butadiene rubber, isoprene rubber, butadiene rubber, ethylene-propylene rubber, etc.

(3) Thermoplastic elastomeric polymers such as a styrene-butadiene-styrene block copolymer, a hydrogenated product thereof, a styrene-isoprene-styrene block copolymer, a hydrogenated product thereof, etc.

(4) Soft resinous polymers such as a syndiotactic 1,2-polybutadiene, an ethylene-vinyl acetate copolymer, a propylene-$\alpha$-olefin (2 or 4 to 12 carbon atoms) copolymer, etc.

(5) Polymeric compositions having ion conductivity of an alkali metal ion, particularly a Li ion.

As the ion conductive polymeric composition in the aforesaid (5), there may be used a system in which an alkali metal salt composed mainly of a lithium salt or lithium is formulated into a polymeric compound such as polyethylene oxide, polypropylene oxide, polyepichlorohydrin, polyphosphazene, polyvinylidene fluoride, polyacrylonitrile, etc., or a system in which an organic compound having high dielectric property such as propylene carbonate, ethylene carbonate, $\gamma$-butyrolactone, etc. is further formulated thereinto. Polyphosphazene may preferably have a polyether chain at a side chain, particularly a polyoxyethylene chain.

The ion conductivity at room temperature of such an ion conductive polymeric composition is preferably $10^{-8}$ S·cm$^{-1}$ or more, more preferably $10^6$ S·cm$^{-1}$ or more, further preferably $10^{-4}$ S·cm$^{-1}$ or more, particularly preferably $10^{-3}$ S·cm$^{-1}$ or more.

The mixing state of the carbonaceous material to be used in the present invention and the polymeric binder described above may have various states. That is, there may be mentioned a state in which the both particles are simply mixed, a state in which a particle of the carbonaceous material is tangled with a fibrous binder, or a state in which a layer of the binder described above such as a rubber polymer, a thermoplastic elastomer, a soft resin, an ion conductive polymeric composition, etc. is attached on the surface of a particle of the carbonaceous material, etc.

When a fibrous binder is used, a diameter of the fiber of said binder is preferably 10 μm or less, more preferably a fibril (extremely fine fiber) of 5 μm or less, and a fibrid (a powdery material having ultrafine tentacular fibrils) is particularly preferred.

The mixing ratio of the carbonaceous material and the binder is preferably 0.1 to 30 parts by weight, more preferably 0.5 to 20 parts by weight, further preferably 1 to 10 parts by weight of the binder based on 100 parts by weight of the carbonaceous material.

Further, with the above mixture, a metal which can form an alloy with an alkali metal which is an active substance may be used by mixing, and of these, preferred is a metal which can form an alloy with lithium.

As the metal which can form an alloy with an alkali metal, there may be mentioned aluminum (Al), lead (Pb), zinc (Zn), tin (Sn), bismuth (Bi), indium (In), magnesium (Mg), gallium (Ga), cadmium (Cd), silver (Ag), silicon (Si), boron (B), antimony (Sb), etc., preferably Al, Pb, In, Bi, Sn and Cd, further preferably Al, Pb, In and Sn, particularly preferably Al, Pb and Sn, most preferably Al and Sn. Or else, an alloy comprising such a metal and an alkali metal, particularly lithium, for example, an lithium aluminum alloy may be used by mixing. Such a metal or alloy may be particulate, in a state of a thin layer coating the surface of the carbonaceous material or a state involved internally of the carbonaceous material.

The formulation ratio of such a metal or alloy is preferably 70 parts by weight or less, more preferably 5 to 60 parts by weight, further preferably 10 to 50 parts by weight, particularly preferably 15 to 40 parts by weight of the metal or alloy based on 100 parts by weight of the carbonaceous material.

An electrode molded product can be obtained by making the carbonaceous material to be used in the present invention into an electrode material comprising a mixture with the binder described above; or a mixture in which a metal which can form an alloy with the active substance as described above or an alloy of the active substance and said metal is further formulated, and molding said electrode material as such into have a shape of an electrode by a method such as roll molding, compression molding, etc. Or else, these components may be dispersed in a solvent, and coated on a current collector made of metal, etc. The shape of the electrode molded product may be set to be a desired shape such as a sheet, a pellet, etc.

On the electrode molded product thus obtained, an alkali metal, preferably lithium metal, which is an active substance can be carried before assembly a battery or during assembly. As the method of carrying the active substance on the carrier, there are the chemical method, the electrochemical method, the physical method, etc. For example, it is possible to use a method in which the electrode molded product is dipped in an electrolyte containing an alkali metal cation, preferably Li ion with a predetermined concentration, and lithium is used as an opposite electrode to carry out electrolytic impregnation with this electrode molded product as the anode, the method in which alkali metal powder, preferably lithium powder is mixed in the course of obtaining the electrode molded product, etc. The method in which lithium metal and the electrode molded product are electrically contacted is also used. In this case, lithium metal and the carbonaceous material in the electrode molded product are preferably contacted through the polymeric composition having lithium ion conductivity.

The amount of lithium carried on the electrode molded material is preferably 0.030 to 0.250 part by weight, more preferably 0.060 to 0.200 part by weight, further preferably 0.070 to 0.150 part by weight, particularly preferably 0.075 to 0.120 part by weight, most preferably 0.080 to 0.100 part by weight based on one part by weight of the carrier.

The electrode of the present invention using such electrode materials is generally used as a negative electrode for a secondary battery, and opposed to a positive electrode through a separator. The material of the positive electrode body is not particularly limited, but, for example, it is preferred that it comprises a metal chalcogen compound which releases or obtains alkali metal cations such as Li ion accompanied with charge-discharge reaction.

As such a metal chalcogen compound, there may be mentioned an oxide of vanadium, a sulfide of vanadium, an oxide of molybdenum, a sulfide of molybdenum, an oxide of manganese, an oxide of chromium, an oxide of titanium, a sulfide of titanium, and complex oxides or sulfides thereof, etc. Preferred are $Cr_3O_8$, $V_2O_5$, $V_6O_{13}$, $VO_2$, $Cr_2O_5$, $MnO_2$, $TiO_2$, $MoV_2O_8$; $TiS_2$, $V_2S_5$, $MoS_2$, $MoS_3$, $VS_2$, $Cr_{0.25}V_{0.75}S_2$, $Cr_{0.5}V_{0.5}S_2$, etc. Also, there may be used an oxide such as $LiCoO_2$, $WO_3$, etc.; a sulfide such as $CuS$, $Fe_{0.25}V_{0.75}S_2$, $Na_{0.1}CrS_2$, etc.; a phosphorus and sulfur compound such as $NiPS_3$, $FePS_3$, etc.; a selenium compound such as $VSe_2$, $NbSe_3$, etc. Also, a conductive polymer such as polyaniline, polypyrrole, etc. can be used.

Further, the carbonaceous material having a specific surface area of 10 m$^2$/g or more, preferably 100 m$^2$/g or more, further preferably 500 m$^2$/g or more, particularly preferably 1000 m$^2$/g, most preferably 2000 m$^2$/g or more may be used for the positive electrode.

For the separator for holding the electrolyte, a material having excellent liquid holding characteristics, for example, nonwoven fabric of a polyolefin such as a polyethylene, a polypropylene, etc. may be used. As the electrolyte, that in which an electrolyte is dissolved in an organic solvent may be used.

As the electrolyte, there may be used an alkali metal salt such as $LiClO_4$, $LiPF_6$, $LiAsF_6$, $LiBF_4$, $LiSO_3CF_3$, $LiN(SO_2CF_3)_2$, etc., a tetraalkylammonium salt, etc. Among them, an alkali metal salt is preferred. The concentration of the electrolyte is preferably 0.2 mol/l or less, more preferably 0.3 mol/l or more and 1.9 mol/l or less. As the organic solvent, there may be mentioned a cyclic ester compound such as ethylene carbonate, propylene carbonate, butylene carbonate, vinylene carbonate, γ-butyrolactone, etc.; a chain ether compound such as 1,2-dimethoxyethane, etc.; a cyclic ether compound such as a crown ether (12-crown-4, etc.), 1,2-dimethyltetrahydrofuran, dioxolan, tetrahydrofuran, etc.; a chain ester compound such as diethyl carbonate, etc.

As the solvent which dissolves the electrolyte, there may be preferably used a mixed solvent comprising at least two kinds of solvents. For example, when ethylene carbonate is used, ethylene carbonate in a solvent mixture is preferably 5 to 60 vol %, more preferably 7 to 50 vol %, further preferably 10 to 45 vol %, particularly preferably 12 to 40 vol %, most preferably 15 to 40 vol %.

Also, a solid electrolyte which is a conductor for an alkali metal cation such as Li ion may be interposed between the positive electrode body and the negative electrode body.

In the battery thus constituted, at the negative electrode, active substance ions are carried on the carrier during charging, and the active substance ions in the carrier are released during discharging, whereby the electrode reaction of charging and discharging proceeds.

On the other hand, at the positive electrode, when a metal chalcogen compound is employed, the active substance ions are released to the positive electrode body during charging, and the active substance ions are carried during discharging, whereby the electrode reaction of charging and discharging proceeds. When a conductive polymer such as polyaniline is employed for the positive electrode, counter ions of the active substance ions are carried on the positive electrode body during charging, and the counter ions of the active substance ions are released from the positive electrode body during discharging, whereby the electrode reaction proceeds.

The battery reaction accompanied with charging and discharging as a battery proceeds according to the combination of the positive electrode body and the negative electrode body as described above.

DESCRIPTION OF THE PREFERRED EMBODIMENTS

Figure 1C:
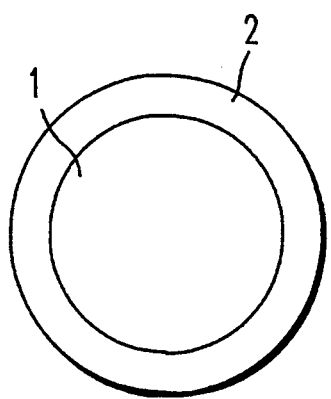
FIG. 1 is a conceptional view illustrating a multiphasic structure of the carbonaceous material to be used in the present invention, wherein
1. is the nucleus, and
2. is the surface layer
Figure 1C:
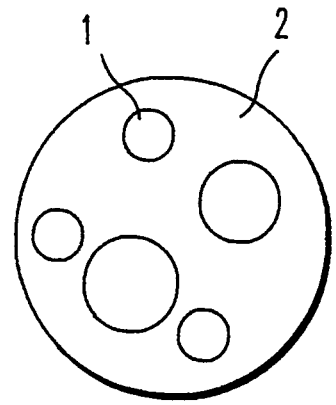
Figure 1C:
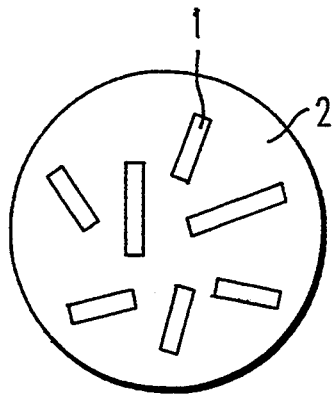
Figure 1D:
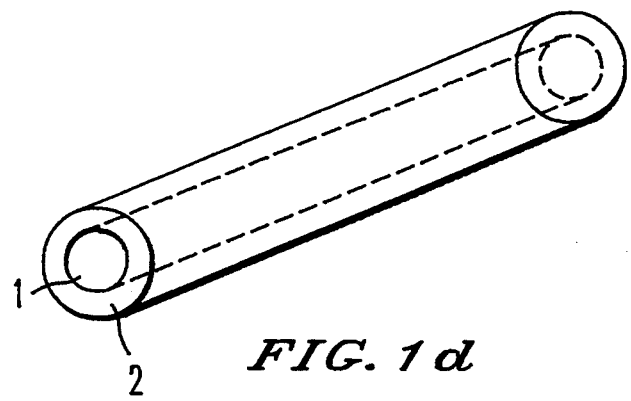

In the following, the present invention is described by referring to Examples and Comparative examples. The present invention is not limited to these Examples. In these Examples, part represents part by weight in all cases.

In the following Examples, X-ray wide angle diffraction, measurement of true density and differential thermal analysis were carried out as described below.
(X-ray wide angle diffraction)
(1) Plane Spacing ($d_{002}$) of (002) Plane The carbonaceous material as such when it was powder, or powdered by an agate mortar when it was fine flake was mixed with high purity silicon powder for X-ray standard as an internal standard substance in an amount of about 15% by weight based on a sample, and the mixture was filled in a sample cell. The wide angle X-ray diffraction curve was measured by the reflection system diffractometer method with CuKα line monochromated by a graphite monochromator as a line source. For correction of the curve, none of the correction concerned with the so-called Rorents, polarizing light factor, absorption factor, atomic scattering factor, etc. was done, but the following simplified method was employed. That is, the baseline for the curve corresponding to (002) diffraction was drawn, and the substantive intensity from the baseline was plotted again to obtain the corrected curve of the (002) plane. The middle point of the segment of the line parallel to the angle axis drawn at ⅔ of the peak height of the curve crossing the diffraction curve was determined, the angle of the middle point was corrected with the internal standard, which was made 2-fold of the diffraction angle, and $d_{002}$ was determined from the wavelength λ of the CuKα line according to the following Bragg's formula.

$$d_{002} = \lambda/2\sin\Theta \text{ [Å]}$$

wherein λ: 1.5418 Å

Θ: diffraction angle corresponding to $d_{002}$ (2) Crystallite Size in the C-axis Direction (Lc)

In the corrected diffraction curve obtained in the previous item, by use of the so-called half-value width β at the position of half of the peak height, the crystallite size in the c-axis direction was determined by the following formula.

$$Lc = K\cdot\lambda/(\beta\cdot\cos\Theta) \text{ [Å]}$$

For the shape factor K, 0.90 was used. λ and Θ have the same meanings as in the previous item.
(True density)

By using a multipycnometer manufactured by Yuasa Ionics K.K., it was measured according to the gas substitution method using helium gas.
(Differential thermal analysis)

By using a thermal analysis system SSC5000 manufactured by Seiko Denshi Kogyo K.K., it was measured at a temperature elevation rate of 20° C./min while flowing 15 ml/min of air per 1 g of a sample.

EXAMPLE 1

(1) Synthesis of Carbonaceous Material

About 100 mg of powder of perylene-3,4,9,10-tetracarboxylic acid dianhydride was elevated up to 900° C. at a temperature elevation rate of 10° C./min under nitrogen gas stream, and maintained at the temperature for 30 minutes. The powder was further elevated up to 2,800° C. at a temperature elevation rate of 20° C./min, and maintained at the temperature for 1 hour.

The carbonaceous material thus prepared had $d_{002}$ of 3.39 Å and Lc of 250 Å in the X-ray wide angle diffraction. The true density was 2.20 g/cm³, and the average particle size was 5 μm.

The particle of this carbonaceous material and powder of perylene-3,4,9,10-tetracarboxylic acid dianhydride were mixed. The mixture was elevated up to 570° C. at a temperature elevation rate of 10° C./min, and maintained at 570° C. for 30 minutes to sublimate said dianhydride. By carrying out thermal decomposition, a new surface layer of the carbonaceous material was formed on the particle of the carbonaceous material described above as a nucleus. The carbonaceous material was further elevated up to 900° C. at a temperature elevation rate of 10° C./min, and maintained at the temperature for 30 minutes to complete formation of the surface layer carbonaceous material. As a result, carbonaceous material particles comprising 50 parts by weight of the nucleus carbonaceous material and 50 parts by weight of the surface layer carbonaceous material were obtained.

The carbonaceous material thus obtained had a true density of 2.10 g/cm³ according to the measurement method described above. Further, in the Raman spectrum analysis using an argon ion laser beam, it had peaks in 1600 cm$^{-1}$ and 1360 cm$^{-1}$, and the ratio R of both peak intensities was 1.0.

(2) Preparation of Electrode Molded Product 5 parts by weight of polyethylene powder was mixed with 95 parts by weight of the particle of the carbonaceous material having a multi-phasic structure obtained in (1), and the mixture was bonded by pressing to a nickel wire mesh to prepare a sheet-shaped electrode having a thickness of 0.25 mm. This electrode was dried by heating at 130° C. under vacuum to obtain an electrode molded product. The amount of the carbonaceous material in this molded product was 17 mg.

(3) Evaluation of Electrode

A glass cell was charged with a propylene carbonate solution containing 1 mol/l of LiClO$_4$, and the electrode molded product prepared in (2) was suspended from the above of this cell as one electrode. As an electrode opposed thereto, an electrode obtained by bonding metallic lithium to a nickel wire mesh by pressing was used.

An operation of charging with a constant current of 5 mA to 0 V and discharging to 1.5 V between both electrodes was repeated. Characteristics at the 3rd cycle and at the 30th cycle are shown in Table 1.

COMPARATIVE EXAMPLE 1

About 100 mg of powder of perylene-3,4,9,10-tetracarboxylic acid dianhydride was elevated up to 900° C. at a temperature elevation rate of 10° C./min under nitrogen gas stream, and maintained at the temperature for 30 minutes. The powder was further elevated up to 2,800° C. at a temperature elevation rate of 20° C./min, and maintained at the temperature for 1 hour.

The carbonaceous material thus prepared had a true density of 2.21 g/cm$^3$, the Raman spectrum thereof using an argon ion laser beam had peaks at 1580 cm$^{-1}$ and 1360 cm$^{-1}$, and the peak intensity ratio R was 0.20.

By using the carbonaceous material thus obtained, an electrode molded product was prepared in the same manner as in Example 1, and by using this product, electrode evaluation was conducted in the same manner as in Example 1. The results are shown in Table 1.

COMPARATIVE EXAMPLE 2

About 100 mg of powder of perylene-3,4,9,10-tetracarboxylic acid dianhydride was elevated up to 900° C. at a temperature elevation rate of 10° C./min under nitrogen gas stream, and maintained at the temperature for 30 minutes.

The carbonaceous material thus prepared had a true density of 1.85 g/cm$^3$, the Raman spectrum thereof using an argon ion laser beam had peaks in 1600 cm$^{-1}$ and 1360 cm$^{-1}$, and the peak intensity ratio R was 1.0.

By using the carbonaceous material thus obtained, an electrode molded product was prepared in the same manner as in Example 1, and by using this product, electrode evaluation was conducted in the same manner as in Example 1. The results are shown in Table 1.

COMPARATIVE EXAMPLE 3

80 parts by weight of the carbonaceous material synthesized in Comparative example 1 and 20 parts by weight of the carbonaceous material synthesized in Comparative example 2 were mixed. This mixed carbonaceous material had a true density of 2.14 g/cm$^3$ and a peak intensity ratio R of 0.36.

By using the carbonaceous material thus obtained, an electrode molded product was prepared in the same manner as in Example 1, and by using this product, electrode evaluation was conducted in the same manner as in Example 1. The results are shown in Table 1.

EXAMPLE 2

The particle of the carbonaceous material synthesized in Comparative example 1 was dipped in a solution in which poly($\alpha$-fluoroacrylonitrile) was dissolved in acetone to coat the surface of said carbonaceous material with poly($\alpha$-fluoroacrylonitrile). This material was elevated up to 900° C. at a temperature elevation rate of 10° C./min under nitrogen gas stream, and maintained at the temperature for 30 minutes. This material was further elevated up to 1,600° C. at a temperature elevation rate of 20° C./min, and maintained at the temperature for 1 hour. Thus, particles of a carbonaceous material comprising 53 parts by weight of a nucleus and 47 parts by weight of a surface layer were obtained.

The carbonaceous material thus obtained had a true density of 2.08 g/cm$^3$, the Raman spectrum thereof using an argon ion laser beam had peaks at 1600 cm$^{-1}$ and 1360 cm$^2$, and the peak intensity ratio R was 1.0.

By using the carbonaceous material thus obtained, an electrode molded product was prepared in the same manner as in Example 1, and by using this product, electrode evaluation was conducted in the same manner as in Example 1. The results are shown in Table 1.

EXAMPLE 3

The particles of the carbonaceous material synthesized in Comparative example 1 were dipped in a solution in which a pitch which was a mixture of condensed polycyclic hydrocarbons was dissolved in toluene to coat the surface of said carbonaceous material with the pitch. This material was elevated up to 1,100° C. at a temperature elevation rate of 10° C./min under nitrogen gas stream, and maintained at the temperature for 30 minutes. Thus, particles of a carbonaceous material comprising 65 parts by weight of a nucleus and 35 parts by weight of a surface layer were obtained.

The carbonaceous material thus prepared had a true density of 2.16 g/cm$^3$, the Raman spectrum thereof using an argon ion laser beam had peaks at 1600 cm$^{-1}$ and 1360 cm$^{-1}$, and the peak intensity ratio R was 0.92.

By using the carbonaceous material thus obtained, an electrode molded product was prepared in the same manner as in Example 1, and by using this product, electrode evaluation was conducted in the same manner as in Example 1. The results are shown in Table 1.

EXAMPLE 4

(1) Formation of Negative Electrode

The carbonaceous material having a true density of 2.25 g/cm$^3$ and $d_{002}$ of 3.36 Å in the X-ray wide angle diffraction, an average particle size of 17 μm and a specific surface area of 8.7 m$^2$/g was heated while stirring in a solvent in which a pitch (a mixture of condensed polycyclic hydrocarbon compounds) was dissolved in a toluene solvent, to coat the surface of the particles of this carbonaceous material with the pitch.

Next, under a nitrogen gas stream, the material was elevated up to 1300° C. at a temperature elevation rate of 20° C./min, and maintained at 1300° C. for 30 minutes, to be carbonized to form carbonaceous material particles having a multiphase structure. Thereafter, the particles were lightly pulverized to obtain particles having an average particle size of 24 μm.

As a result of measurement, the ratio of the carbonaceous material which was a surface layer was 40 parts by weight based on 100 parts by weight of the carbonaceous material which became a nucleus. Also, in the Raman spectrum analysis using an argon ion laser beam (5145 Å), R described above was 0.60.

The true density was 2.17 g/cm$^3$, and the BET specific surface area was 1.9 m$^2$/g. In the X-ray wide angle diffraction, d002 had two peaks at 3.36 Å and 3.49 Å, and the ratio of both peak intensities ($I_{3.49 Å}/I_{3.36 Å}$) was 0.040.

Also, the whole fine pore volume of the fine pores having a size in the range of 10 Å or more and 300 Å or less measured by using the volumetric method was 2.0 × 10$^2$ ml/g.

With 6 parts by weight of polyethylene was mixed 94 parts by weight of this carbonaceous material, and the mixture was compression molded into pellets having a diameter of 16 mm. The molded product was dried by heating at 130° C. under vacuum to mold a negative electrode.

(2) Formation of Positive Electrode

After 500 mg Of V$_2$O$_5$—p$_2$O$_5$, 25 mg of polytetrafluoroethylene and 25 mg of carbon black were kneaded and made into a sheet, a pellet electrode having a diameter of 16 mm was formed.

(3) Formation of Secondary Electrode Cell and Evaluation of Characteristics of Secondary Battery Before assembly a secondary electrode cell, the positive electrode was preliminarily charged with 1.2 mA for 15 hours in an ethylene carbonate (50 vol %)/diethyl carbonate (50 vol %) solution containing 1.0 mol/l of LiClO$_4$, by using metallic lithium as an opposite electrode thereto. In the same manner, the negative electrode was also preliminarily charged with 1.2 mA for 7 hours.

Next, a separator made of polypropylene impregnated with an electrolyte comprising 1.0 mol/l of LiClO$_4$ dissolved in a solvent mixture of ethylene carbonate (50 vol %) and diethyl carbonate (50 vol %) was interposed between both electrodes to form a secondary battery cell.

This secondary battery cell was placed in a thermostatic chamber at 10° C., and an operation of charging with a constant current of 1.5 mA to 3.3 V and then discharging to 1.8 V between both electrodes was repeated Characteristics at the 2nd cycle and at the 20th cycle are shown in Table 2.

COMPARATIVE EXAMPLE 4

(1) Formation of Negative Electrode

With 6% by weight of polyethylene was mixed 94% by weight of the particle of graphite with a single-phase structure, having a true density of 2.25 g/cc, d$_{002}$ of 3.36 Å and Lc of 1000 Å or more in the X-ray wide angle diffraction, an R value of substantially 0.1 in the Raman spectrum separation and an average particle size of 17 μm, and a negative electrode was formed in the same manner as in Example 1.

(2) Formation of Positive Electrode

A positive electrode was formed in the same manner as in Example 1.

(3) Constitution and Evaluation of Secondary Electrode Cell

In the same manner as in Example 4, a secondary battery cell was constituted, and characteristics of the secondary battery were evaluated. The results are shown in Table 2.

TABLE 1

|  | 3rd cycle | | | 30th cycle | | |
| --- | --- | --- | --- | --- | --- | --- |
|  | Charged amount (mAh) | Discharged amount (mAh) | Electric Charge efficiency (%) | Charged amount (mAh) | Discharged amount (mAh) | Electric Charge efficiency (%) |
| Example 1 | 4.1 | 4.0 | 98 | 4.1 | 4.0 | 98 |
| Comparative example 1 | 0.5 | 0.4 | 80 | 0.4 | 0.3 | 75 |
| Comparative example 2 | 3.2 | 3.1 | 97 | 3.2 | 3.1 | 97 |
| Comparative example 3 | 1.0 | 0.9 | 90 | 1.0 | 0.9 | 90 |
| Example 2 | 4.0 | 3.9 | 98 | 4.0 | 3.9 | 98 |
| Example 3 | 4.3 | 4.2 | 98 | 4.3 | 4.2 | 98 |

TABLE 2

|  | 2nd cycle | | | 20th cycle | | |
| --- | --- | --- | --- | --- | --- | --- |
|  | Charged amount (mAh) | Discharged amount (mAh) | Electric Charge efficiency (%) | Charged amount (mAh) | Discharged amount (mAh) | Electric Charge efficiency (%) |
| Example 4 | 11.0 | 10.9 | 99.0 | 10.9 | 10.8 | 99.0 |
| Comparative example 4 | 2.1 | 1.8 | 86.0 | 2.0 | 1.7 | 85.0 |

By using the carbonaceous material as described above as a main component, the electrode material of the present invention exhibits characteristics such as large electrode capacity and excellent charging and discharging cycle characteristics when it is made into an electrode molded product and used as an electrode for secondary battery.

We claim:

1. An electrode for secondary battery, comprising an alkali metal which is an active substance carried on a carrier comprising as a main component a carbonaceous material, and having a multi-phasic structure comprising a nucleus and a surface layer on the nucleus and satisfying the following:

(1) a true density $\rho$ is 1.80 g/cm$^3$ or more, and
(2) in the Raman spectrum analysis using an argon ion laser beam with a wavelength of 5145 Å, it has a peak P$_A$ in the range of 1580 to 1620 cm$^{-1}$ and a peak P$_B$ in the range of 1350 to 1370 cm$^{-1}$, and the ratio of intensity I$_B$ of the P$_B$ to intensity I$_A$ of the P$_A$, R=I$_B$/I$_A$ is 0.4 or more, wherein the plane spacing d$_{002}$ of said nucleus is less than 3.45 Å and the plane spacing d$_{002}$ of said surface layer is 3.45 Å or more.

2. The electrode according to claim 1, wherein the carbonaceous material has a true density $\rho$ of 2.00 g/cm$^3$ or more.

3. The electrode according to claim 1, wherein the carbonaceous material has a half-value half-width of peak P$_A$ of 25 cm$^{-1}$ or more, and a half-value half-width of peak P$_B$ of 20 cm$^{-2}$ or more.

4. The electrode according to claim 1, wherein the carbonaceous material has the above R of 0.6 or more.

5. The electrode according to claim 1, wherein the carbonaceous material has a ratio (G value) of integrated intensity of spectrum in 1580 to 1620 cm$^{-1}$ to integrated intensity of spectrum in 1340 to 1380 cm$^{-1}$ in the Raman spectrum analysis is 0.3 or more.

6. The electrode according to claim 5, wherein the carbonaceous material has the above true density $\rho$ and the above G value satisfying the following formulae:

$$2.05 \leq \rho \leq 2.26$$
$$G \geq 0.30$$
$$G \geq 3.30\rho + 7.50.$$

7. The electrode according to claim 1, wherein the ratio of a peak intensity of the peak of 3.45 Å or more to a peak intensity of the peak of less than 3.45 Å is 0.001 or more.

8. The electrode according to claim 7, wherein the ratio of a diffraction intensity at 2$\theta$=25° to a peak intensity of the peak of less than 3.45 Å is 0.001 or more.

9. The electrode according to claim 1, wherein the plane spacing d$_{002}$ of the nucleus is 3.36 to 3.42 Å, and the plane spacing d$_{002}$ of the surface layer is 3.47 Å or more.

10. The electrode according to claim 9, wherein the plane spacing d$_{002}$ of the of a nucleus is 3.37 to 3.41 Å, and the plane spacing d$_{002}$ of the surface layer is 3.49 to 3.75 Å.

11. The electrode according to claim 10, wherein the carbonaceous material has a ratio of a sum of integrated intensities of the peaks of which the plane spacing d$_{002}$ is 3.45 Å or more to a sum of integrated intensities of the peaks less than 3.45 Å is 0.001 to 0.8.

12. The electrode according to any of claim 1, wherein the H/C atomic ratio of the carbonaceous material is 0.08 or less.

13. The electrode according to claim 1, wherein the carbonaceous material exhibits at least two overlapped exothermic peaks in the range of 150° C. or higher in differential thermal analysis.

14. The electrode according to claim 13, wherein the surface layer exhibits an exothermic peak in the range of lower than 850° C., and the nucleus exhibits an exothermic peak in the range of 810° C. or higher in differential thermal analysis.

15. The electrode according to claim 1, wherein the surface layer has a line width between peaks of 10 Gauss or more, and the nucleus has a line width between peaks of less than 100 Gauss in primary differential absorption spectrum of electronic spin resonance.

16. The electrode according to claim 1, wherein the carbonaceous material is particulate and has a volume average particle size of 200 μm.

17. The electrode according to claim 1, wherein the carbonaceous material is fibrous and has a diameter of 1 to 25 μm and a length of 10 mm or less.

18. The electrode according to claim 1, wherein the carbonaceous material has a specific surface area measured by using the BET method of 1 to 100 m$^2$/g.

19. The electrode according to claim 1, wherein the carbonaceous material has a total fine pore volume of $1.5 \times 10^{-3}$ ml/g.

* * * * *